3,705,810
COFFEE EXTRACTION
Andrew T. Lendvay, Oakland, N.J.
(2916 Halstead Road, Richmond, Va. 23235)
No Drawing. Continuation of application Ser. No.
653,328, July 14, 1967. This application Aug. 24,
1970, Ser. No. 66,651
Int. Cl. A23f 1/08
U.S. Cl. 99—71                                                  13 Claims

ABSTRACT OF THE DISCLOSURE

In the production of soluble coffee, the extraction yield of soluble coffee is increased without flavor impairment by extracting roasted coffee after blending with an additional amount of soluble coffee gum.

---

This application is continuation of application Ser. No. 653,328, now abandoned, filed July 14, 1967.

BACKGROUND OF THE INVENTION

The present invention relates to soluble coffee and, more particularly, to obtaining from a given amount of coffee more soluble coffee than would be generally obtainable from such amount of coffee by conventional methods.

Conventionally, roasted coffee is extracted with hot water or steam.

The brew obtained by such extraction is then concentrated and dried in accordance with various methods known to those skilled in the art, which methods of concentration and drying of the coffee extract or brew are of no concern with respect to the present invention.

In the conventional hot water extraction of roasted coffee inert, non-flavoring extractives, flavoring components and fat (coffee oil) are transferred from the roasted coffee into the aqueous phase.

It is desirable to extract from a given quantity of coffee the largest possible amount or proportion of flavoring components which can be extracted without impairing the flavor quality.

The percentage of extractives thus removed from the roasted and, usually, ground coffee can be increased by increasing the extraction temperature, time and/or pressure. However, extended extraction time, increase in temperature and pressure are possible only to a limited extent since such more severe extraction conditions would impair the flavor and quality of the coffee brew and of the soluble coffee produced therefrom.

Since most of the flavoring constituents are mainly fat-bound and only a small portion of the fatty carrier (lipids) will be transferred from the coffee into the extract, the balance of the flavoring constituents remaining in the extracted coffee grounds becomes stale due to the heat treatment during the extraction process.

Under the usual extraction conditions, most of the lipid materials and the flavoring materials associated therewith remain in the undissolved extraction waste, i.e., the coffee grounds, from which it is no longer possible to extract suitable flavoring constituents, i.e., flavoring constituents which upon drying would give a soluble coffee of acceptable quality.

Consequently, only a fraction of the flavoring constituents of the coffee will be extracted by these conventional methods.

The thus obtained aqueous extract which need not be a complete, true solution, but to some extent may be an emulsion or dispersion, constitutes the starting material for the conventional concentration process (removal of water) which eventually results in the dry product known as soluble coffee or instant coffee.

It is an object of the present invention to increase the proportion of flavoring constituents which may be extracted from a given quantity of coffee without impairing the quality of the thus obtained brew or of the dry soluble coffee produced therefrom.

SUMMARY OF THE INVENTION

The proportion of soluble coffee of desired quality which can be extracted from a given amount of coffee is increased by extracting the coffee with an aqueous extraction fluid after blending with soluble coffee gum, which will increase the amount of flavoring constituents which—under given extraction conditions—will be transferred to the extract from the coffee which is subjected to extraction.

DESCRIPTION OF THE PREFERRED EMBODIMENTS

Surprisingly it has been found that the proportion of flavoring constituents which may be extracted from the roasted coffee will be greatly increased if additional water-soluble coffee gum, essentially consisting of hemicelluloses and like large molecular materials soluble in the extraction liquid under the prevailing extraction conditions is blended with the roasted coffee prior to the extraction and dissolved in the extraction fluid.

The coffee gum may be intimately combined with the coffee by grinding coffee and dry gum together prior to contacting of the thus obtained ground material with the extraction fluid such as hot (boiling) water or steam.

Thus, the soluble dry additive may be blended with the roasted coffee prior to grinding of the latter. During such blending and particularly during the grinding of the blend, the dry soluble additive particles serve as absorbents for oil and coffee flavoring constituents.

The term "coffee gum" as used herein denotes a water-soluble gum-like material consisting predominantly of hemicellulose, obtained by subjecting coffee beans or extracted coffee waste grounds to a treatment which will cause partial solubilization of the coffee material; and extracting the solubilized material which then may be dried. The coffee gum thus is an at least substantially pure coffee product.

Since the coffee gum is per se soluble and will increase the proportion of flavoring constituents which will be extracted from the coffee, the amount of instant coffee which is obtained according to the present invention from a given amount of coffee will increase by the amount of coffee gum which has been added and by the amount of additional flavoring constituents which will be extracted from the roasted coffee due to the presence of the added coffee gum.

In other words, the increase in extracted flavoring material will be proportionate to the amount of soluble additive in the extraction mixture.

Surprisingly, it has been found that coffee gum, extracted from coffee, for instance in the manner described in more detail below, when added to the coffee extraction system will be capable of substantially increasing the proportion of flavoring material which is extracted from coffee. To use coffee gum for this purpose has the further and very substantial advantage that the coffee brew will consist only of water and coffee extractives, and thus the soluble coffee produced therefrom will be a true coffee product.

The coffee gum, a material of mainly hemicellulosic nature, may be obtained in various ways.

One process of obtaining coffee gum comprises alkaline treatment of coffee, preferably of defatted waste grounds, followed by de-alkalinization of the solute and—if necessary—further solubilization of the extracted material by enzymatic treatment. Such further solubilization is advantageous in cases where the de-alkalinized, i.e., substantially neutralized solute tends to gel formation.

Another method of obtaining coffee gum which gives good results for the purposes of the present invention consists in the enzymatic treatment of green coffee or of the defatted coffee waste with hemicellulase, cellulase and pectinase.

Referring to the first described process for obtaining coffee gum, the alkaline treatment may be carried out with aqueous solutions of sodium carbonate, sodium hydroxide, ammonium hydroxide, calcium oxide or calcium hydroxide at a pH of between 9 and 13. It is preferred to carry out the alkaline treatment with a calcium hydroxide solution having a pH of between about 10 and 12. The alkaline treating liquid may also be obtained with the help of ion exchange resins which release OH ions to obtain a pH of between 10 and 12.

The de-alkalinization of the thus formed alkaline coffee gum solution may be carried out by neutralization, for instance chemically if the reaction product is volatile, such as neutralizing ammonia with a solution of hydrochloric acid, or salts may be removed by means of ion exchange resins, or cations only may be removed by ion exchange.

De-alkalinization may also be carried out by precipitating cations and removal of the precipitate. For instance if alkalinization was accomplished with CaO or $Ca(OH)_2$, the addition of sulfuric acid or $CO_2$ will cause precipitation of an insoluble calcium salt.

It is thus easily possible to carry out the solubilization in such a manner that the obtained aqueous solution of gum is at least substantially free of non-coffee constituents.

However, since the extracted material may partially precipitate or form a gel during such neutralization, it is frequently advantageous to subject the solution to the enzymatic action of hemicellulase, cellulase or pectinase or a combination of such enzymes.

As mentioned further above, coffee gum may also be obtained by treating green coffee enzymatically by soaking the green coffee in water in which between about 0.1 and 1%, preferably between about 0.1% and 0.5% of at least one enzyme such as cellulase or hemicellulase or pectinase has been dispersed. After soaking the green coffee for a sufficiently long time in the enzymatic solution, the beans will be subjected to roasting and grinding, followed by extraction. The thus treated coffee beans will release more soluble extract than beans which had not been subjected to the enzymatic pretreatment.

The soluble hemicellulose-containing coffee gum may be obtained in various ways.

For instance, coffee waste from a previous extraction of roasted ground coffee may be defatted and the defatted waste boiled in an aqueous liquid at a pH between 9 and 13, preferably between 10 and 12, whereby soluble hemicellulose will be extracted to an extent which may exceed 25% of the dry weight of the defatted coffee waste.

However, it is also possible to obtain the same result by treating the green coffee with enzymes so as to form soluble hemicelluloses which will then be extracted from the subsequently roasted coffee together with other extractives and which, when then extracted into the extraction liquid will cause extraction of a larger proportion of the flavoring constituents of the roasted coffee.

When pre-treating coffee beans with an enzyme solution, it is possible to combine the drying of the thus pre-treated beans with the roasting of the same.

It is also possible to mix dried soluble coffee gum, or a liquid concentrate thereof with the roasted coffee prior to grinding of the same. In this manner, during the grinding of the roasted coffee a certain proportion of flavoring constituents will be absorbed by the dry soluble hemicellulose powder and thereby more easily transferred into the aqueous extract and, simultaneously the obtained amount of soluble flavor-rich extract of a given concentration will be increased in the same proportion.

The following examples are given as illustrative only for the obtaining of coffee gum from coffee without, however, limiting the invention to the specific details of the examples:

EXAMPLE I 100 gr. of defatted coffee grounds (1.5% moisture content) were ground to a fine powder and then mixed with 1000 ml. of 2% aqueous $Na_2CO_3$ solution.

The thus obtained slurry had a pH of 10.2 and was boiled for one hour. Thereafter the supernatant liquid was decanted and put aside.

The residue was then mixed with another portion of 800 ml. of 2% aqueous sodium carbonate solution and the thus obtained slurry (pH 10.38) was again boiled for one hour, then decanted and the supernatant liquid united with the first obtained superntant liquid. The residue was then twice more extracted in the manner described above. A combined total of 3150 ml. supernatant liquids was obtained in these four extraction steps and was acidified with aqueous hydrochloric acid to a pH of 5.2 and then precipitated with acetone, the latter being added until the further addition of acetone did not cause additional precipitation. The precipitate was then separated from the liquid and, after drying, found to weigh 29.4 g.

EXAMPLE II 100 g. of defatted pulverized coffee grounds were mixed with 1000 ml. of a 2% aqueous solution of sodium hydroxide so as to obtain 1100 g. of a slurry having a pH of 12.1.

The thus obtained slurry was boiled for one hour, and thereafter the supernatant liquid was decanted. 800 ml. water were added to the thus separated coffee ground powder and the thus formed slurry boiled for one hour and thereafter the supernatant liquid was again decanted.

Forming of a slurry, boiling and decanting of the supernatant liquid was then repeated three times, each time with 700 ml. water.

The combined five liquids amounting to 3560 ml. were acidified with aqueous HCl to a pH of 4 and the coffee gum was then precipitated with ethanol, yielding after drying 34.9 g.

EXAMPLE III

By carrying out the process of Example II at room temperature and replacing each boiling step by steeping for 24 hours, a total dry yield of 21.9 g. of coffee gum, consisting mainly of hemicellulose is obtained.

EXAMPLE IV

A slurry of 100 g. coffee waste powder in 1000 ml. of water containing 8 g. of CaO (pH 12.1) was boiled for one hour and thereafter the supernatant liquid was decanted.

Boiling and decanting was repeated four times, each time with 800 ml. water and, after the last boiling, the liquid was separated from the thus extracted coffee grounds by suction filtration.

The combined supernatant liquids were neutralized with $5nH_2SO_4$ to a pH of 6.5. The thereby precipitated $CaSO_4$ was removed by spinning and the thus obtained liquid was treated with methanol and chilled. A precipitate of coffee gum was obtained which upon washing with methanol and drying amounted to 26.8 pure gum since the calcium salt has been previously removed.

EXAMPLE V 135 g. of pulverulent waste coffee grounds were boiled for one hour in 1200 ml. water containing 11.2 g. $Ca(OH)_2$, (pH of the slurry 11.7).

Thereafter, the supernatant liquid was decanted and the boiling of the residue and decanting of the supernatant liquid was repeated four times, each time with 1000 ml. water.

The supernatant liquids were combined and $CO_2$ was bubbled through the combined liquid until precipitation of calcium carbonate was completed. The thus precipitated calcium carbonate was then removed by spinning and the residual clear liquid mixed with methanol in order to precipitate the dissolved coffee gum. The thus formed precipitate was separated from the residual liquid and homogenized in a Waring Blendor with fresh ethanol and thereafter dried under vacuum.

EXAMPLE VI

The process of Example V was carried out, however, the homogenized product was dried by freeze drying.

EXAMPLE VII

The process of Example V was carried out up to the removal of calcium carbonate and the thus obtained pure coffee gum solution was subjected to freeze drying without preceding alcohol precipitation. A more finely pulverulent and even more easily soluble product was obtained in this manner.

EXAMPLE VIII

To avoid gelatinization when forming a concentrated coffee gum solution, or to improve solubility, 50 g. of dried coffee gum obtained as described in any of the preceding examples was dispersed in 1000 ml. water containing 0.1% equal to 1 g. hemicellulase (Takamine) and kept under occasional stirring for 24 hours at 95° F. Thereafter, the mixture was boiled for 10 minutes and then dried.

EXAMPLE IX

The process of Example VIII was carried out with 0.2% hemicellulase dispersed in 1000 ml. of water.

EXAMPLE X

The process of Example VIII was carried out, however, with 0.1% hemicellulase and 0.1% cellulase dispersed in 1000 ml.

EXAMPLE XI 20 kg. green coffee were mixed with 15 liters of an aqueous enzyme solution containing 0.2% hemicellulase and 0.25% cellulase (Takamine). After maintaining the mixture for 24 hours at 98–99° F., the thus treated coffee was subjected to roasting and grinding.

The treating of coffee, or the extraction of ground roasted coffee in the presence of added coffee gum or the like, may be carried out in various ways, as will be desscribed in the following examples:

EXAMPLE XII

The product obtained according to Example XI which contains additional soluble coffee gum due to the enzymatic treatment thereof, may be boiled or precolated in conventional manner to obtain a coffee brew for subsequent drying to form instant coffee.

EXAMPLE XIII

Roasted coffee may be mixed with coffee gum produced, for instance, in accordance with any one of Examples I to X. Preferably, coffee gum will be admixed in an amount equal to between 1% and 25% of the weight of the roasted coffee, and in most cases between about 5 and 15 parts by weight of coffee gum will be admixed to 100 parts of roasted coffee. The thus obtained mixture is then ground and subjected to conventional extraction.

EXAMPLE XIV

A mixture is formed of 100 parts by weight of ground coffee and between about 2 and 25 parts by weight, preferably between 5 and 15 parts by weight of coffee gum. The thus formed mixture is then subjected to conventional extraction.

EXAMPLE XV 1000 g. of freshly roasted and still hot coffee beans were intimately blended with 150 g. soluble coffee gum obtained by any of the methods described in Examples I to X.

The thus formed blend was ground and then extracted with steam.

The flavor of the larger amount of soluble coffee obtained upon drying of the brew was practically indistinguishable from that of the smaller amount of soluble coffee obtained in similar manner but without addition of the soluble coffee gum.

It will be understood from the foregoing that by proceeding in accordance with the present invention, the yield of soluble coffee of the desired quality may be substantially increased, generally by about 10% or more over the yield obtained by the same extraction and drying processes when the same are carried out without the addition of coffee gum.

The coffee gum which is extracted from coffee in accordance with the present invention may also find other uses for any of the purposes for which generally water-soluble gums are used. By producing the coffee gum as described in the examples hereinabove, the same may be obtained in the form of a dry, substantially tasteless powder of white or light grey or light tan color.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

What I claim is:

1. In a method of producing soluble coffee, which method includes extracting roasted coffee with an aqueous extracting fluid adapted to extract flavoring constituents from coffee so as to form a dispersion of a portion of said flavoring constituents in said extracting fluid, and drying the thus formed extract, the improvement which comprises:
    (a) blending said roasted coffee prior to said extracting with water soluble, solid coffee gum in comminuted form: said water soluble coffee gum being the product of defatted coffee waste or of green coffee beans that have been enzymatically treated with an enzyme selected from the group consisting of cellulase, hemicellulase and pectinase,
    (b) keeping the blended coffee gum and roasted coffee intimately combined until an amount of oil and coffee flavoring constituents is absorbed from said roasted coffee on said coffee gum,
        (1) said amount being sufficient to increase the proportion of flavoring constituents which will be extracted from said coffee; and
    (c) extracting said coffee in the presence of said coffee gum having said amount of oil and coffee flavoring constituents absorbed thereon.

2. A method as defined in claim 1, wherein a mixture of said roasted coffee and of said coffee gum is ground together prior to extraction of said mixture with said aqueous fluid.

3. A method as defined in claim 1, wherein said extracting fluid is selected from the group consisting of aqueous liquids and steam.

4. A method as defined in claim 1, wherein the amount of said coffee gum equals between about 1% and 25% of the weight of the coffee to be extracted.

5. A method as defined in claim 1, wherein said amount of coffee gum equals between about 5% and 15% of the weight of the coffee to be extracted.

6. In a method of producing soluble coffee, which method comprises extracting roasted coffee with an aqueous extracting fluid adapted to extract flavoring constituents from coffee so as to form a dispersion of a portion of said flavoring constituents in said extraction fluid, the improvement which comprises:
  (a) treating green coffee or defatted coffee waste with an alkaline aqueous liquid so as to form soluble coffee gum and to obtain a solution of soluble coffee gum in said alkaline aqueous liquid;
  (b) substantially neutralizing said alkaline aqueous coffee gum solution in such a manner as to obtain a substantially neutral solution consisting essentially only of water and coffee extractives including soluble coffee gum;
  (c) substantially separating said coffee gum from said water; and
  (d) extracting said roasted coffee with said extracting fluid in the presence of an effective amount of said coffee gum capable of increasing the proportion of flavoring constituents which will be extracted from said coffee,
    (1) whereby upon drying of the thus formed extract an increased amount of soluble coffee including an increased amount of flavoring constituents is obtained.

7. A method as defined in claim 6, wherein said separation of said coffee gum from said water is carried out by precipitation of said coffee gum with an organic liquid which is miscible with water and in which said coffee gum is insoluble.

8. A method as defined in claim 7, wherein said organic liquid is selected from the group consisting of lower aliphatic alcohols and acetone.

9. A method as defined in claim 7, wherein said coffee gum is obtained in substantially dry form by freeze drying of the organic liquid-containing precipitate thereof.

10. A method as defined in claim 6, wherein said substantially neutral solution of coffee gum is subjected to enzymatic treatment with an enzyme selected from the group consisting of cellulase, hemicellulase and pectinase so as to reduce the tendency of said solution to gelatinize.

11. A method as defined in claim 6, wherein said alkaline aqueous liquid includes calcium hydroxide, said calcium hydroxide is neutralized by precipitating with sulfuric acid or carbon dioxide whereby a calcium salt is precipitated, and the thus precipitated calcium salt is separated from the solution prior to separating of the coffee gum from the water.

12. A method as defined in claim 6, wherein said alkaline aqueous liquid contains ammonia and the ammonia of said solution is neutralized by introduction of hydrochloric acid and the thus formed ammonium chloride is volatilized.

13. A method as defined in claim 6, wherein said coffee gum is separated from said water by freeze drying of said neutral solution.

References Cited

UNITED STATES PATENTS

| | | | |
|---|---|---|---|
| 1,367,715 | 2/1921 | Pratt | 99—71 |
| 2,282,139 | 5/1942 | Kellogg | 99—71 |
| 3,022,173 | 2/1962 | Tiedemann | 99—71 |

FOREIGN PATENTS

| | | | |
|---|---|---|---|
| 7,427 | 3/1910 | Great Britain | 99—65 |
| 47,330 | 12/1939 | Holland | 99—65 |
| 48,182 | 4/1940 | Holland | 99—71 |
| 263,967 | 9/1949 | Switzerland | 99—71 |
| 500,390 | 3/1954 | Canada | 99—65 |
| 940,867 | 11/1963 | Great Britain | 99—65 |
| 952,147 | 10/1956 | Germany | 99—65 |
| 1,010,762 | 3/1952 | France | 95—71 |
| 1,096,510 | 2/1955 | France | 99—71 |

FRANK W. LUTTER, Primary Examiner

R. HALPER, Assistant Examiner

U.S. Cl. X.R.

99—65